D. T. PHILLIPS.
AGRICULTURAL PULVERIZER.
APPLICATION FILED JUNE 15, 1912.

1,075,493.

Patented Oct. 14, 1913.

2 SHEETS—SHEET 1.

Witnesses:

Inventor:
Darius T. Phillips
By Brown & Hopkins
Attys.

D. T. PHILLIPS.
AGRICULTURAL PULVERIZER.
APPLICATION FILED JUNE 15, 1912.
1,075,493.
Patented Oct. 14, 1913.
2 SHEETS—SHEET 2.
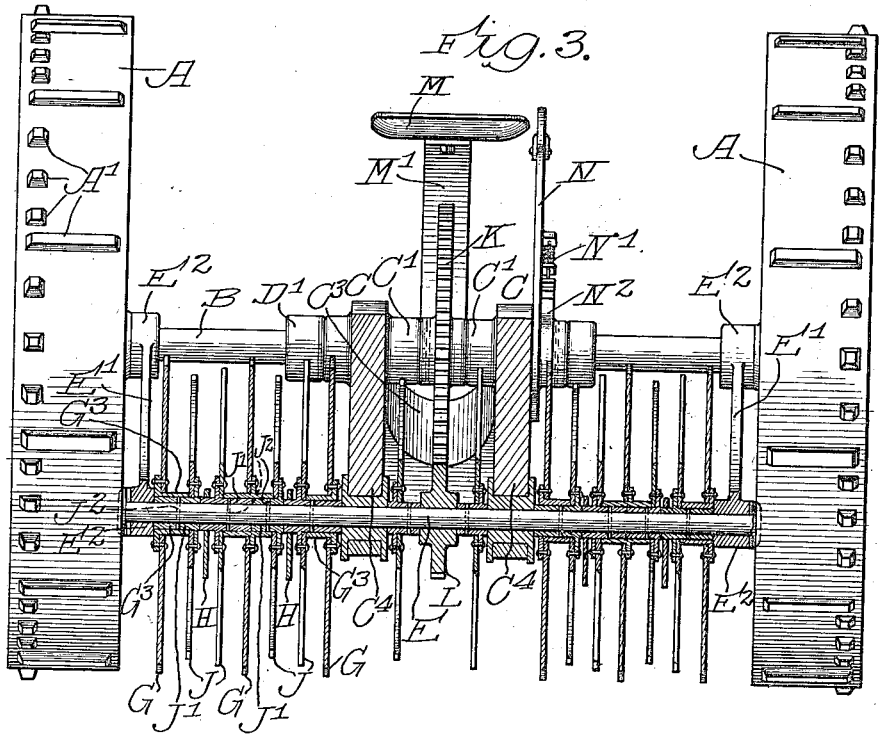
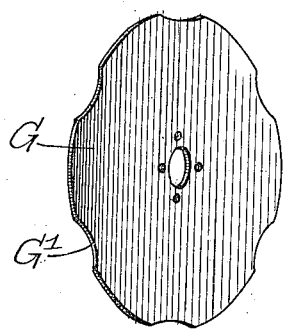
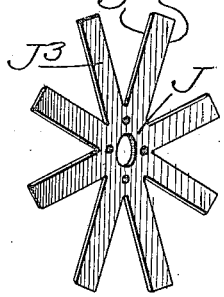
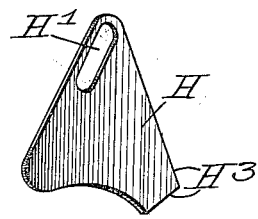
Witnesses:
Inventor:
Darius T. Phillips
By Brown & Hopkins
Attys

UNITED STATES PATENT OFFICE.

DARIUS T. PHILLIPS, OF CHICAGO, ILLINOIS.

AGRICULTURAL PULVERIZER.

1,075,493.

Specification of Letters Patent.    Patented Oct. 14, 1913.

Application filed June 15, 1912. Serial No. 703,771.

*To all whom it may concern:*

Be it known that I, DARIUS T. PHILLIPS, a citizen of the United States, residing at Chicago, in the county of Cook and State of Illinois, have invented certain new and useful Improvements in Agricultural Pulverizers, of which the following is a specification.

My invention relates to agricultural implements or apparatus, and has more particular reference to improvements in that type of apparatus known as pulverizers.

The primary object of my invention is to provide an improved pulverizing machine which will be effective and efficient in operation, simple, strong and reliable in construction, and more capable of rapidly and thoroughly handling an area of plowed land than the pulverizers in use at the present time.

A further object of my invention is to provide an improved pulverizer which will be mounted on traction wheels or like supporting members, and which will utilize the tractive effort of said supporting wheels to actuate or positively drive pulverizing mechanism.

To the attainment of these and other new and useful objects hereinafter appearing, my invention consists in the features of novelty in the construction, combination and arrangement of parts herein described and shown in the accompanying drawings, which illustrate one embodiment of my invention, and more particularly set forth in the appended claims.

Figure 2:
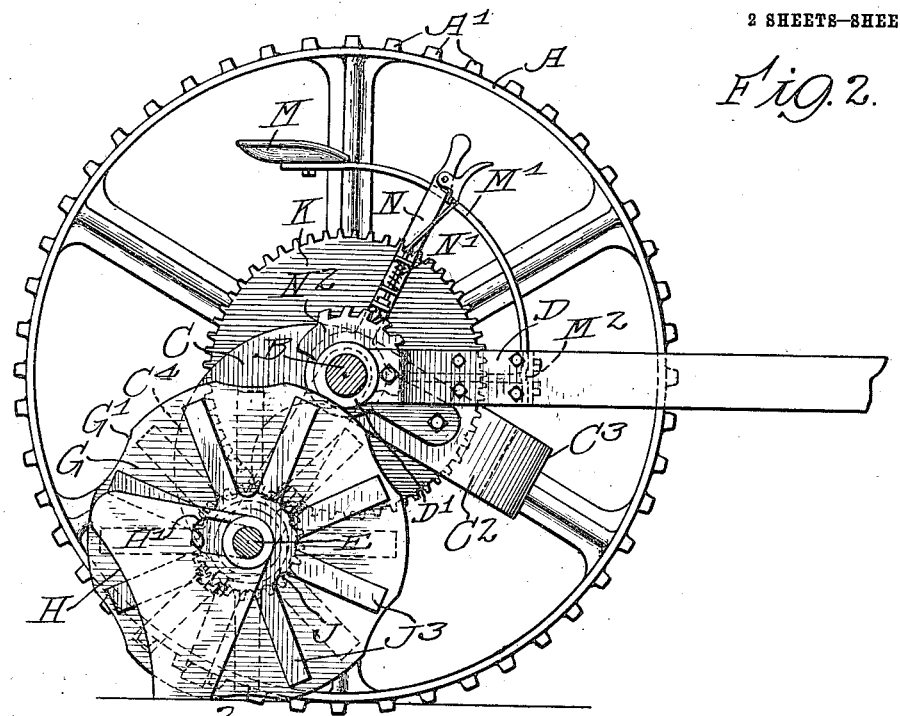
Figure 1:
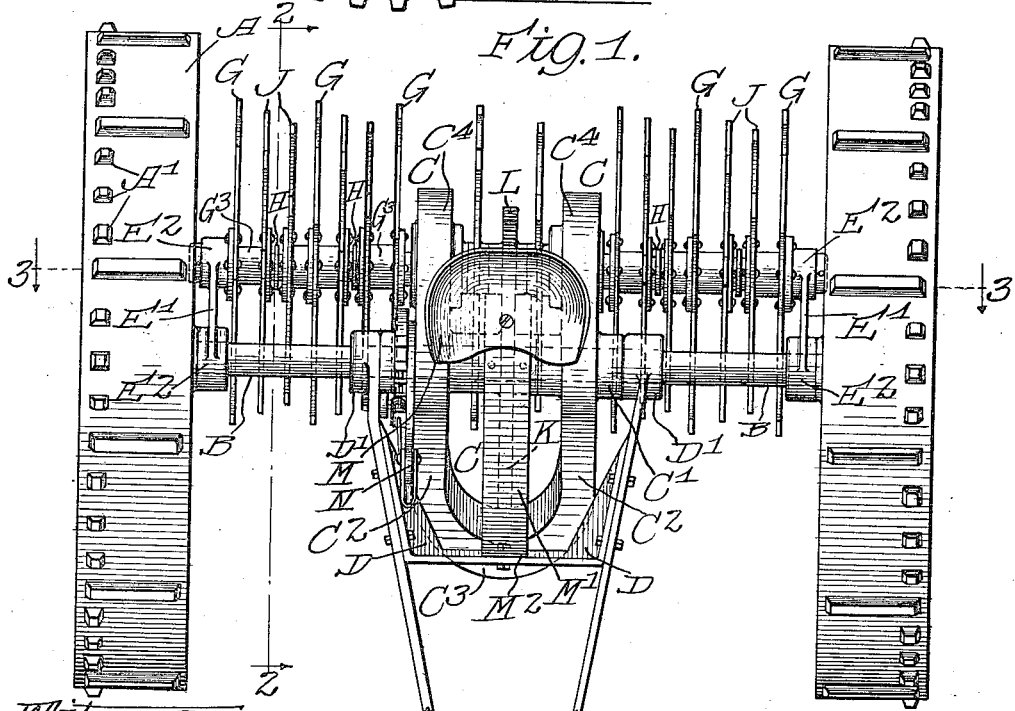

In the drawings—Figure 1 is a top plan view of the structure embodying my invention. Fig. 2 is a transverse sectional view thereof on the line 2—2 of Fig. 1. Fig. 3 is a section at right angles thereto on the line 3—3 of Fig. 1, and Figs. 4, 5 and 6 are detailed perspective views of the several forms of cutters or pulverizer members.

The accompanying drawings illustrate that structure wherein I prefer to embody my invention and whereby I have in practice obtained the most satisfactory results.

For the purposes of obtaining an understanding of my invention reference may be had to these drawings and to the description thereof, but it will be obvious to one skilled in the art after having obtained an understanding of my invention from the disclosures herein made, that my invention is not limited or restricted to the particular structure shown.

The structure shown has two large supporting wheels A which carry the various operating parts. These supporting wheels may be of the usual type of traction wheel commonly employed in agricultural apparatus. They should, however, be quite broad rimmed and of sufficient diameter and strength to properly perform their functions, and to prevent them from sinking too much into the ground because of the weight of the machine. The rims or fellies of these wheels may, and preferably do, have series of suitably formed lugs or projections $A^1$ to obtain the maximum tractive effort upon the ground, particularly since I use these wheels not only to support the parts, but to serve as a simple and effective method of driving certain operating parts, more particularly described hereinafter.

The supporting wheels are spaced a suitable distance apart to accommodate the pulverizing apparatus therebetween, and are mounted upon the ends of a strong axle or shaft B, being keyed to said shaft so as to rotate the shaft as they travel. On the central portion of this main axle is a strong, heavy yoke C having bearings $C^1$ through which the shaft or axle B passes, and which permit the yoke to be swung about said shaft as a center. The forward end portions of the two sides $C^2$ of the yoke are connected by an integral curved portion $C^3$, and those portions $C^4$ of the side members of the yoke which lie beyond or in the rear of the axle B curve downwardly toward the ground, so that in effect the yoke forms a bell crank lever, the pivotal point of which is the axle B. A draft yoke or frame D to which the draft animals may be hitched to draw the apparatus along the ground, is also attached to the shaft or axle B. As will be seen more particularly in Figs. 1 and 2, this draft frame spans or bridges the bell crank yoke and has bearing members $D^1$ for the axle B positioned adjacent to the outer faces of the side members of the pivotal yoke C, so that the pulling power will be better distributed over the width of the machine and eliminate the tendency of any lateral motion with respect to the draft frame.

Journaled in the extreme lower ends of the rear portion $C^4$ of the yoke is another shaft E. In order to avoid subjecting this shaft E to the various bending strains, due to its being journaled at its central portion in the bell crank yoke, I also provide supports for the ends of the shaft. These end supports being preferably in the form of simple reaches or links $E^1$, having journals $E^2$ on their lower ends for the shaft E and on their upper ends for the axle B. By this construction it will be seen that the axle B and shaft E are positively and strongly held in parallel relation, and at the same time the shaft E may be swung about the axle B for the purpose of raising and lowering it as desired. On the shaft E I mount a plurality of cutting or pulverizing members which, as the machine travels along the ground, operate to reduce the plowed earth to a pulverized condition. Some of these cutting or pulverizing members are freely rotatable upon the shaft E and operate idly to pulverize the plowed earth by contact with the earth itself, while others of these members are positively driven so as to be more effective, not only in pulverizing the earth, but in cutting stalks and similar material in or lying upon the ground. The idly operating pulverizing members are preferably made in two forms, namely, disks G and trailer blades H. The disks are preferably in the form of flat circular sheets of metal, having broad notches $G^1$ cut in their peripheries at intervals to render them more effective in pulverizing the earth. They are preferably bolted or otherwise fastened to sleeves $G^3$, which are freely rotatable upon the shaft E, as shown in Figs. 3 and 4. These disks serve as rolling cutters and are maintained firmly in cutting position by the weight of the series of pulverizing members and cutters, and the other parts of the machine supported by the yoke. The peripheries of the disks may be given any degree of sharpness desired for the purpose.

The trailer blades H are preferably flat and substantially triangular in form, as shown in Fig. 6. These blades have slots or openings $H^1$ adjacent one of their corners, and the shaft E passes through said slots. This construction allows the blades H to trail along, following the irregularities in the earth's surface, and because of their free action in this respect they have a tendency to exert in a sense a chopping action upon the plowed earth. In this respect they act to reduce the smaller lumps or chunks of earth untouched by the other pulverizing members, and they serve the further important function of breaking up any chunks of earth which may be carried over by the positively driven cutters or members, thus also clearing the members of earth which would otherwise become lodged therebetween or be thrown rearwardly of the machine. Their pivotal slotted connection with the shaft E permits considerable latitude of movement in various directions. The bulk of the weight of these blades lies almost wholly in the rear of their connection with the shaft E and is sufficient to maintain them active. Their lower edges or corners $H^3$ may be sharpened if desired.

The positively driven pulverizing member or cutters J are securely keyed or otherwise fastened to rotate with the shaft E, and a convenient way of mounting them is to provide them with sleeves or hubs $J^1$, as shown more clearly in Fig. 3. These hubs may be fastened to the shaft by means of the transverse pins $J^2$. The cutting members J are preferably provided with a number of radially disposed cutting blades or knives $J^3$, which have their cutting edges $J^4$ made quite sharp, so as to render them extremely effective in severing or cutting stalks and other similar material into small pieces. I find that the most satisfactory results are obtained by driving the cutters J in a direction opposite to the direction of rotation of the rolling cutters G, and as a convenient means of driving these cutters I provide a series of gears between the main axle B and the shaft E. These gears are preferably positioned centrally of the machine between the members of the bell crank yoke C, as clearly shown, but it will be obvious that any suitable driving connection may be employed or the gears may be positioned at any desired point on the axle and shaft. In the structure shown in the drawings I find it advantageous to rotate the cutters J at somewhat greater speed than the speed of rotation of the axle B, hence I have provided a large gear K on the axle B and a proportionately smaller pinion or gear L on the shaft E (Figs. 2 and 3). It is obvious that any arrangement of the disks or pulverizing members and cutters on the shaft E may be employed, as found best adapted to manufacturing and operating conditions. I have obtained satisfactory results by the relative disposition of the pulverizing members shown in Figs. 1, 2 and 3 of the drawings. The advantage of making the pulverizing members as units and providing individual hubs or sleeves for each of them, as previously explained, lies in the fact that the expense of repair and renewal of the pulverizing members is minimized, and the ease of assembling and dis-assembling the machine is quite marked. If desired a seat M for the operator may be mounted upon a curved spring $M^1$, secured at its lower end $M^2$ to the draft frame D.

It is often desirable in a machine of this character to raise the pulverizing mechanism up free of the ground when the machine is traveling from place to place. Any customary or suitable form of device for this purpose may be used; for instance, the yoke C may be provided with an upstanding lever N disposed in convenient reach of the operator on the seat and having a latch N¹ adapted to coöperate with a toothed member or segment N² fixed on the draft frame D, as is clearly illustrated in Figs. 1, 2 and 3. Thus by pressing forward on the lever N the operator may swing the pulverizing members upward clear of the ground, in which position they may be locked by dropping the latch N¹ into the teeth of the segment N².

What I claim is:—

1. In an agricultural pulverizer of the class described, a traveling wheeled support in combination with a plurality of pulverizing members mounted thereon, and adapted to be directly actuated by contact with the earth over which the machine travels, and a plurality of independent positively driven cutter members axially alined with said pulverizing members and coöperating therewith to reduce the earth to pulverized condition.

2. In an agricultural pulverizer of the class described, a traveling wheeled carriage, and a common shaft supported thereby, in combination with a plurality of pulverizing disks mounted on said shaft, and adapted to be directly actuated by contact with the earth over which the machine travels, and a plurality of independent rotary cutter means mounted on said shaft and connected to and adapted to be positively driven by the supporting wheels of the machine.

3. In an agricultural pulverizer of the class described, a supporting frame having supporting wheels, in combination with a series of pulverizing members mounted on said frame and connected to and positively driven by said supporting wheels, and an independent series of pulverizing members axially alined with and interposed between said positively driven members and adapted to be actuated by direct contact with the earth over which the machine travels.

4. In an agricultural pulverizer of the class described, a supporting frame having supporting wheels and a connecting axle, in combination with a series of pulverizing cutters mounted on said frame and connected to and positively driven by said supporting wheels, an independent series of interspersed pulverizing members alined with said cutters and adapted to be actuated by direct contact with the earth over which the machine travels, a common shaft supporting said cutters and members, and a yoke swingingly carried by said axle and supporting said shaft for simultaneously raising said series of pulverizing members and cutters out of contact with the ground when the machine is traveling from place to place.

5. An agricultural pulverizer having a group of idly rotating pulverizer members and an interspersed group of positively driven pulverizer members axially alined therewith.

6. In an agricultural pulverizer of the class described, a suitable frame having supporting wheels, in combination with a group of rotary pulverizing members suspended from said frame and adapted to be actuated by direct contact with the ground over which the machine travels, a plurality of independent pulverizing members interspersed between the members of said first group, and driving mechanism interconnected between the supporting wheels and said independent pulverizing members for positively actuating them.

7. In an agricultural pulverizer of the class described, a suitable frame having supporting wheels in combination with a group of pulverizing members suspended from said frame and adapted to be freely rotated by direct contact with the ground over which the machine travels, a plurality of independent pulverizing members interspersed between the members of said first group, and driving mechanism interconnected between the supporting wheels and said independent pulverizing members for positively rotating them in a direction opposite to that of the freely rotatable members.

8. In an agricultural pulverizer of the class described, a suitable frame having supporting wheels in combination with a group of pulverizing members suspended from said frame and adapted to be freely rotated by direct contact with the ground over which the machine travels, a plurality of independent pulverizing members interspersed between the members of said first group, and driving mechanism interconnected between the supporting wheels and said independent pulverizing members for positively rotating them in a direction opposite to that of the freely rotatable members, and mechanism for raising and lowering all of said pulverizing members simultaneously.

9. In an agricultural pulverizer of the class described, a suitable frame having supporting wheels in combination with a shaft suspended from said frame, a group of spaced rolling cutters freely rotatable on said shaft, a group of independent cutters mounted on said shaft and mechanism positively driven by the supporting wheels and connected to said independent cutters for rotating them.

10. In an agricultural pulverizer of the class described, a suitable frame having supporting wheels in combination with a shaft suspended from said frame, a group of spaced rolling cutters freely rotatable on said shaft, a group of independent cutters mounted on said shaft and mechanism positively driven by the supporting wheels and connected to said independent cutters for rotating them, and a number of trailer blades interspersed between said cutters and loosely hung from said shaft.

11. In an agricultural pulverizer of the class described, the combination of a main axle having supporting wheels mounted thereon and spaced apart to accommodate the tract of land to be pulverized, a heavy yoke mounted thereon and depending therefrom, a shaft rotatably mounted in the depending end of said yoke, driving connections between said axle and shaft for rotating the shaft oppositely to the direction of rotation of said axle, a plurality of spaced cutters fastened to said shaft and having radially disposed cutting knives, a plurality of pulverizing disks spaced apart and freely rotatable on said shaft in a direction opposite to that of said cutters and a plurality of spaced trailer blades loosely hung from said shaft.

12. In an agricultural pulverizer of the class described, the combination of a main axle having supporting wheels mounted thereon and spaced apart to accommodate the tract of land to be pulverized, a heavy yoke mounted thereon and depending therefrom, a shaft rotatably mounted in the depending end of said yoke, driving connections between said axle and shaft for rotating the shaft oppositely to the direction of rotation of said axle, a plurality of spaced cutters fastened to said shaft and having radially disposed cutting knives, a plurality of pulverizing disks spaced apart and freely rotatable on said shaft in a direction opposite to that of said cutters and a plurality of spaced trailer blades loosely hung from said shaft, mechanism for bodily raising said shaft and pulverizer elements up clear of the ground, and means for hitching draft animals to said axle.

13. In an agricultural pulverizer of the class described, the combination of a suitable frame and supporting wheels therefor, a plurality of spaced stalk and earth cutters supported by said frame, means for positively driving said cutters and a plurality of trailer blades pivotally supported by said frame in axial relation to and interspersed between said cutters for clearing said cutters of chunks or lumps of earth which become lodged therebetween.

In testimony whereof I have signed my name to this specification, in the presence of two subscribing witnesses, on this 13th day of June, A. D. 1912.

DARIUS T. PHILLIPS.

Witnesses:
EDGAR FRANCIS BERNBIEN,
CHARLES H. SEEM.